(No Model.)
E. W. CREECY.
COLLAR BUTTON.
No. 563,452. Patented July 7, 1896.
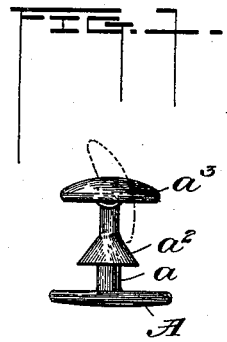
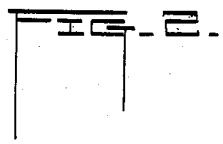
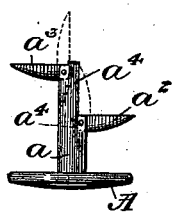
Witnesses
Inventor
Edward W. Creecy
by David H. Mead
his Attorney

UNITED STATES PATENT OFFICE.

EDWARD W. CREECY, OF WASHINGTON, DISTRICT OF COLUMBIA.

COLLAR-BUTTON.

SPECIFICATION forming part of Letters Patent No. 563,452, dated July 7, 1896.

Application filed February 14, 1894. Serial No. 500,146. (No model.)

*To all whom it may concern:*

Be it known that I, EDWARD W. CREECY, a citizen of the United States, residing at Washington, in the District of Columbia, have invented certain new and useful Improvements in Collar-Buttons; and I do hereby declare the following to be a full, clear, and exact description of the invention, such as will enable others skilled in the art to which it appertains to make and use the same.

This invention relates to collar-buttons.

The object of the invention is to produce a collar-button whereby a collar may be attached to the neckband of a shirt, cuffs attached to wristbands, &c., in a rapid and easy manner, and whereby the fabrics of the different articles will be separated, thus facilitating the rapid detachment of the articles when desired.

With these objects in view the invention consists of a collar-button made up of a base-plate, a shank projecting from the base-plate, a conical-shaped projection intermediate of the shank, and a head pivotally attached to the end of the shank.

Further, the invention consists of a collar-button made up of a base-plate, a shank projecting from the base-plate, a pivoted head attached to the end of the shank, and a projection pivotally connected to the shank intermediate of the base-plate and the head.

The invention is illustrated in the accompanying drawings, in which—

Figure 1 is a side view of a collar-button constructed in accordance with my invention, the outer retaining projection being shown as movable. Fig. 2 is a side view of a collar-button in which both the retaining projections are movable.

In the drawings, A represents the base of the button, to which is attached the shank $a$, of the usual length of shanks in buttons of this kind. The shank is provided with two retaining projections $a^2$ and $a^3$, the projection $a^2$ being designed in connection with the base of the button to confine the neckband or wristband, and the projection $a^3$ being designed in connection with the projection $a^2$ to confine a collar or cuff to be attached to the neckband or wristband.

In the form of button shown in Fig. 1 of the drawings the upper confining projection $a^3$ is hinged to the ends of the shank $a$ to permit of its being turned to the position shown in dotted lines in Fig. 1 for the purpose of introducing the end of the button through a buttonhole, or to be turned to the position shown in full lines in the figure, to retain a collar or cuff in place on the button. The portion $a^2$ in Fig. 1 is cone-shaped in general contour, so that it may be easily placed through a buttonhole.

In the form of button shown in Fig. 2 both the confining projections are shown as movable. The projections used in the form shown in this figure are designed to extend laterally from the shank $a$ in opposite directions. The projection $a^2$ is of a length to have its outer end flush with the outer end of the shank when it is folded into position. (Shown in dotted lines in Fig. 2 of the drawings.) The outer face of the projection $a^2$ is beveled in order to produce a reduced end, and thus to offer the least possible resistance to the introduction of the button into a buttonhole.

The ends of the projections when made of the form shown in Fig. 2 are square, and they bear against springs $a^4$ $a^4$, preferably seated in the shank $a$. These springs press against the projections and hold them in any position to which the projection may be turned.

Having thus fully described my invention, what I claim as new, and desire to secure by Letters Patent, is—

1. A collar-button consisting of a base-plate, a shank projecting from the base-plate, a conical-shaped projection intermediate of the shank, and a head pivotally attached to the end of the shank, substantially as described.

2. A collar-button comprising a base-plate, a shank projecting from the base-plate, a pivoted head attached to the end of the shank, and a projection pivotally connected to the shank intermediate of the base-plate and the head, substantially as described.

3. A collar-button comprising a base-plate, a shank projecting from the base-plate and formed with seats on opposite sides thereof, one seat being near the end opposite the base and one being intermediate of the shank, and projections pivotally supported in the seats, and adapted to be turned to lie parallel to the shank or to be turned to project on opposite sides thereof, substantially as described.

In testimony whereof I affix my signature in presence of two witnesses.

EDWARD W. CREECY.

Witnesses:
F. B. KEEFER,
S. G. HOPKINS.